(12) United States Patent
Higuchi et al.

(10) Patent No.: US 8,305,724 B2
(45) Date of Patent: Nov. 6, 2012

(54) CIRCUIT PROTECTOR AND ELECTRIC CONNECTION BOX

(75) Inventors: Yutaka Higuchi, Yokkaichi (JP); Mitsuaki Kohsaka, Yokkaichi (JP); Seiji Takahashi, Yokkaichi (JP)

(73) Assignees: Autonetworks Technologies, Ltd, Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 274 days.

(21) Appl. No.: 12/733,742

(22) PCT Filed: Oct. 7, 2008

(86) PCT No.: PCT/JP2008/068208
§ 371 (c)(1),
(2), (4) Date: Mar. 18, 2010

(87) PCT Pub. No.: WO2009/048052
PCT Pub. Date: Apr. 16, 2009

(65) Prior Publication Data
US 2010/0195257 A1    Aug. 5, 2010

(30) Foreign Application Priority Data
Oct. 9, 2007  (JP) ................................. 2007-263358

(51) Int. Cl.
*H02H 3/20* (2006.01)
*H02H 9/04* (2006.01)
*H02H 3/00* (2006.01)
(52) U.S. Cl. .......................... 361/91.5; 361/91.1; 361/86
(58) Field of Classification Search .................. 361/91.5
See application file for complete search history.

(56) References Cited

U.S. PATENT DOCUMENTS

| 5,898,557 | A  | * | 4/1999  | Baba et al. ..................... 361/103 |
| 6,268,986 | B1 |   | 7/2001  | Kobayashi et al. |
| 6,373,671 | B1 | * | 4/2002  | Watanabe et al. ............ 361/93.8 |
| 6,630,748 | B2 | * | 10/2003 | Sato et al. ..................... 307/10.1 |
| 6,901,520 | B2 | * | 5/2005  | Odaohhara et al. ........... 713/300 |
| 7,342,762 | B2 |   | 3/2008  | Harris, IV |
| 2002/0105769 | A1 | | 8/2002 | Sato et al. |

FOREIGN PATENT DOCUMENTS

DE            199 58 934 A1    11/2000
DE      10 2006 052 135 A1     7/2007

(Continued)

OTHER PUBLICATIONS

German Office Action issued in German Application No. 11 2008 002 704.8 dated Jun. 21, 2011 (with translation).
Written Opinion of the International Searching Authority issued on Dec. 16, 2008 in International Application No. PCT/JP2008/068208 (with translation).

(Continued)

*Primary Examiner* — Dharti Patel
(74) *Attorney, Agent, or Firm* — Oliff & Berridge, PLC

(57) ABSTRACT

An electric connection box 10 comprises an FET 32 for connection with a power supply B, a substrate side conduction path 18 connected with the FET 32 and connecting the FET 32 with a load L, a diode element D connected with the substrate side conduction path 18 electrically and to transfer heat and having a PN junction, and a CPU 19 for judging whether the voltage drop value between the input/output terminals 25 and 26 of the diode element D is larger than a threshold or not and delivering an off-command signal to the FET 32 if a judgment is made that the voltage drop value is smaller than the threshold.

12 Claims, 10 Drawing Sheets

FOREIGN PATENT DOCUMENTS

| | | |
|---|---|---|
| JP | A-04-334640 | 11/1992 |
| JP | 07-050389 | 2/1995 |
| JP | A-2001-025165 | 1/2001 |
| JP | A-2001-095141 | 4/2001 |
| JP | A-2001-112160 | 4/2001 |
| JP | A-2001-244415 | 9/2001 |
| JP | A-2002-232280 | 8/2002 |
| JP | A-2002-353404 | 12/2002 |

OTHER PUBLICATIONS

International Search Report issued on Dec. 16, 2008 in International Application No. PCT/JP2008/068208.

Jun. 26, 2012 Office Action issued in Japanese Patent Application No. 2009-536995 (with translation).

Jul. 12, 2012 Office Action issued in a Chinese Patent Application No. 200880110292.7.

* cited by examiner

CIRCUIT PROTECTOR AND ELECTRIC CONNECTION BOX

TECHNICAL FIELD

The present invention relates to a circuit protector and an electric connection box.

BACKGROUND ART

Patent Literature 1 has been well-known as a conventional circuit protector, which protects a circuit by detecting an abnormal current flowing in the circuit. This circuit protector comprises a semiconductor switching element connected between a power supply and a load and a protective circuit for outputting a control signal to the semiconductor switching element. The semiconductor switching element and the load are connected through a wire. A threshold current for damage prevention of the semiconductor switching element is set in the protective circuit. When an over current exceeding the above-mentioned threshold current is to flow between the semiconductor switching element and the load due to, for example, a short-circuit of the load, the protective circuit outputs an off-command signal to the semiconductor switching element and turns the same to the off-state. This can achieve the damage prevention of the semiconductor switching element.

[Patent literature 1]: Japanese Unexamined Patent Publication No. H04-334640

Such as aging degradation of the insulating coating of wires may probably cause a so-called layer "layer short circuit," in which a current that is smaller than a threshold current for the damage prevention of the semiconductor switching element but is greater than the one at the time of normal energization, flows. In this case, according to the configuration of a conventional art, the current flowing in the wire is smaller than the threshold current, and the protective circuit does not therefore output an off-command signal to the semiconductor switching element. Therefore, a relatively large electrical current continuously flows in the wire, causing the heat generated from the core wire to remain in the wire, and thus may furthermore degrade the insulating coating of the wire.

In order to overcome the above problem, a temperature detection element connected with an abnormality determination circuit may be arranged in the wire, and when the temperature of the wire exceeded a threshold, the semiconductor switching element may be turned to the off-state.

However, in general, one temperature detection element is connected with the abnormality determination circuit through two conduction paths that are led out from the temperature detection element. The conduction paths twice as many as the temperature detection element are therefore separately required, and may cause a complicated configuration of the circuit protector on the whole.

The present invention has been completed based on the above circumstances, and its purpose is to provide a circuit protector having a simpler configuration.

The present invention relates to a circuit protector and an electric connection box comprising: a semiconductor switching element connected with a power supply, a conduction path connected with the semiconductor switching element and connecting the semiconductor switching element with a load, a semiconductor element having a PN junction and electrically connected with the conduction path to transfer heat, judgment means for judging whether a voltage drop value between input/output terminals of the semiconductor element is greater than a threshold or not, and control means for outputting an off-command signal to the semiconductor switching element when a judgment is made by the judgment means that the voltage drop value is smaller than the threshold.

In addition, the semiconductor element being connected with the conduction path to transfer heat means a state where heat is transferred from the conduction path to the semiconductor element so that the temperature of the conduction path and that of the semiconductor element become nearly the same, and, in short, the semiconductor element is connected with the conduction path.

An element for detecting temperatures and judgment means are generally connected each other through two leads led out from the element. According to the present invention, the semiconductor element is connected to both the conduction path and the judgment means. Accordingly, the conduction path can serve as one lead in the semiconductor element, and thus the configuration of the circuit protector can be simplified.

The present invention can simplify the configurations of the circuit protector and the electric connection box.

DESCRIPTION OF SYMBOLS

10 . . . electric connection box
12 . . . circuit board
15 . . . wire (conduction path)
16 . . . female terminal fitting (conduction path)
18 . . . substrate side conduction path (conduction path)
19 . . . CPU (judgment means, control means)
21 . . . branch path (conduction path)
23 . . . male tab (conduction path)
32 . . . FET (semiconductor switching element)
33 . . . ROM (memory device)
45 . . . switching element
D . . . diode element (semiconductor element)

BEST MODE FOR CARRYING OUT THE INVENTION

Embodiment 1

Embodiment 1 in which a circuit protector according to the present invention is applied to an electric connection box 10 for vehicle is described in reference to FIGS. 1 to 5. The present embodiment is arranged between a power supply B and a load L such as a lamp and audio, so as to control energization (on/off) of the load L.

Figure 1:
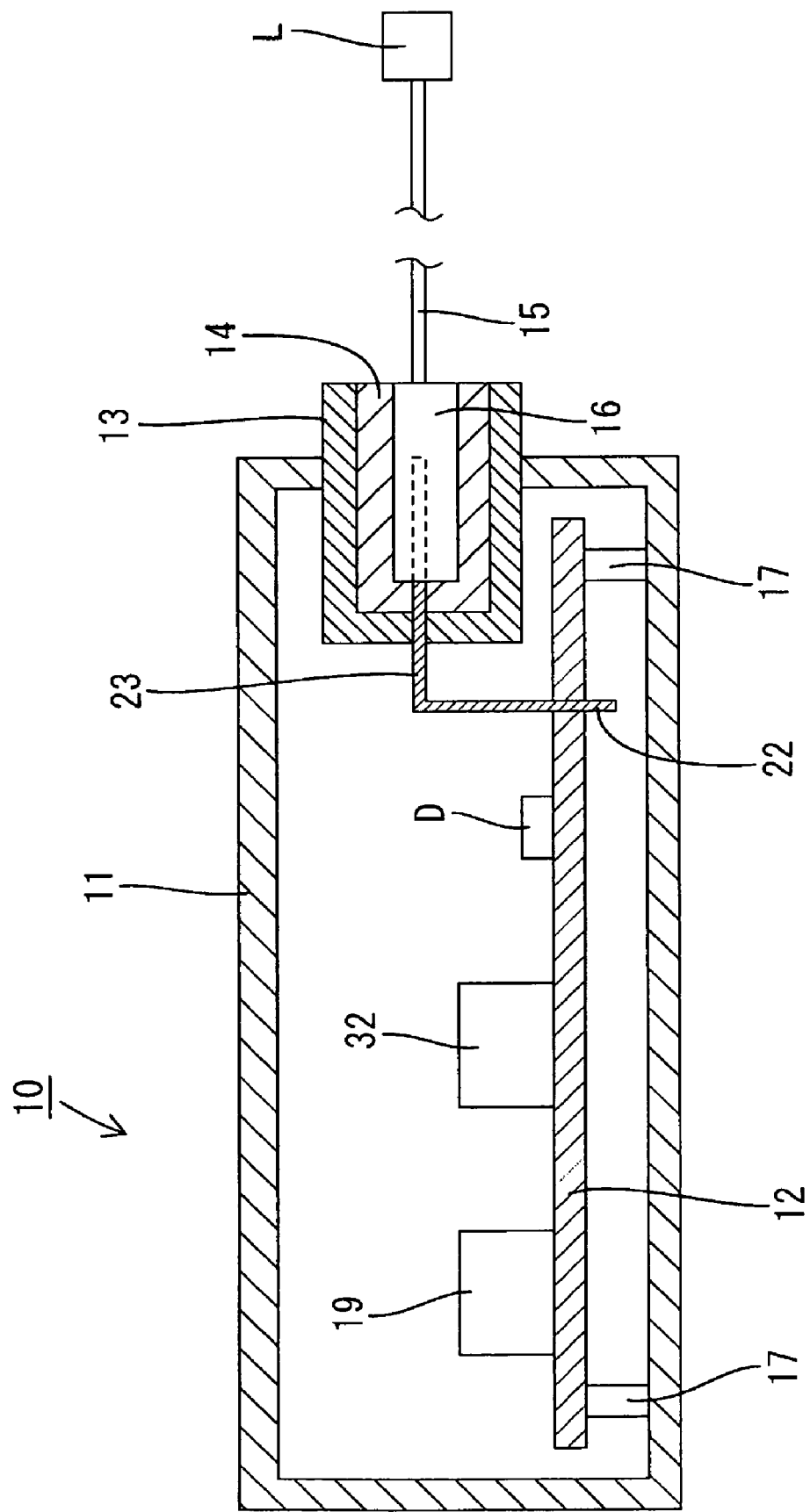
FIG. 1 is a cross-sectional side view showing an electric connection box according to Embodiment 1 in the present invention.

As shown in FIG. 1, the electric connection box 10 comprises a circuit board 12 housed in a case 11. The case 11 is provided with a connector 13. The connector 13 is engagable with a mating connector 14. The mating connector 14 houses a female terminal fitting 16 (corresponding to a conduction path) connected with a wire 15 (corresponding to a conduction path). The wire 15 is connected with the load L.

The circuit board 12 is held by a holding member 17 formed therein by a known method such as, for example, adhesive bonding and screwing. A substrate side conduction path 18 (corresponding to a conduction path) is formed in the circuit board 12 by a printed wiring technology. A CPU 19 is mounted on the circuit board 12 and connected to the substrate side conduction path 18. Additionally, an FET 32 (corresponding to a semiconductor switching element) is mounted on the circuit board 12 and connected to the substrate side conduction path 18.

Figure 2:
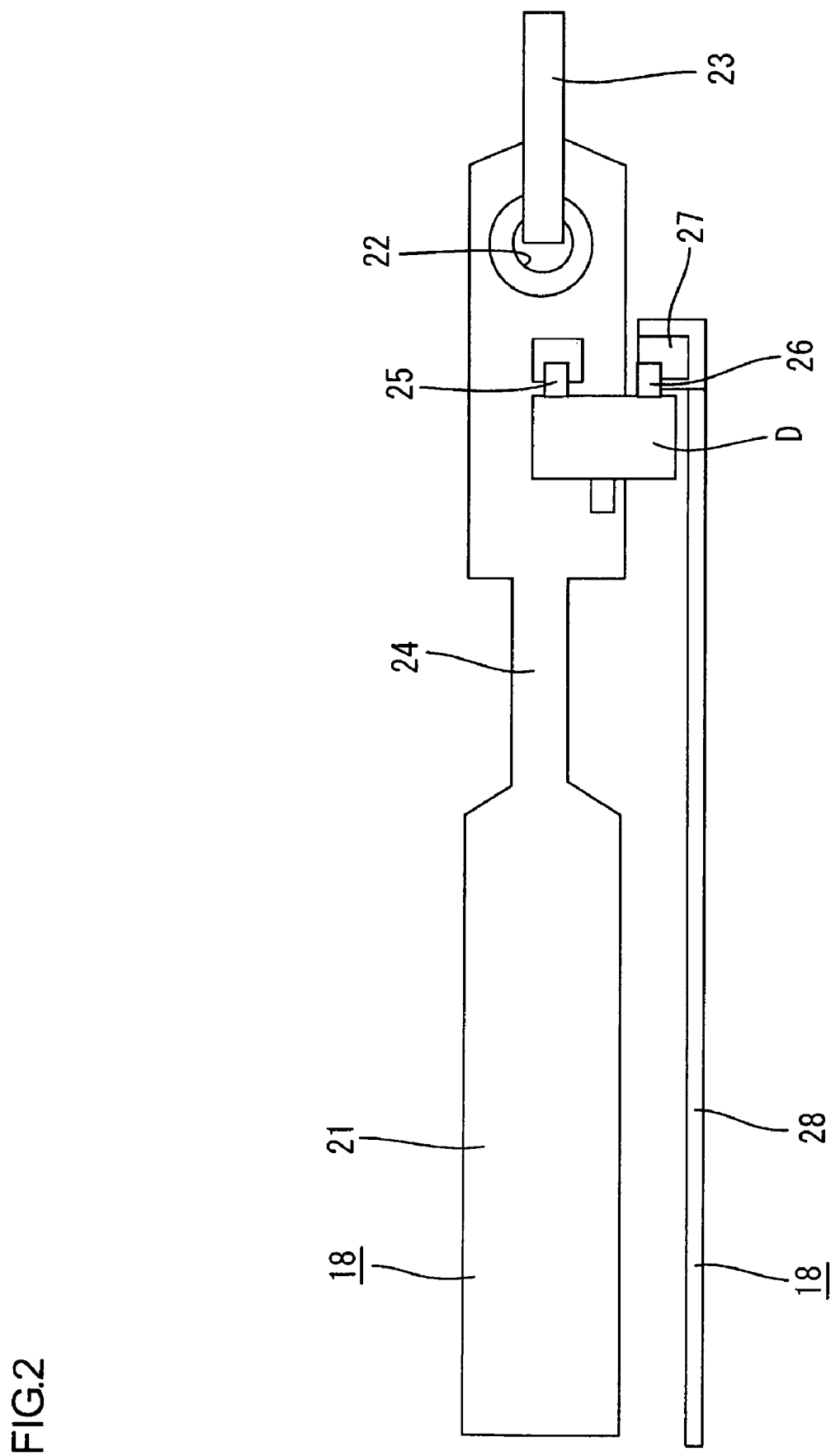
FIG. 2 is an enlarged plan view of a main part of a connection structure between a diode element and a branch path.
Figure 3:
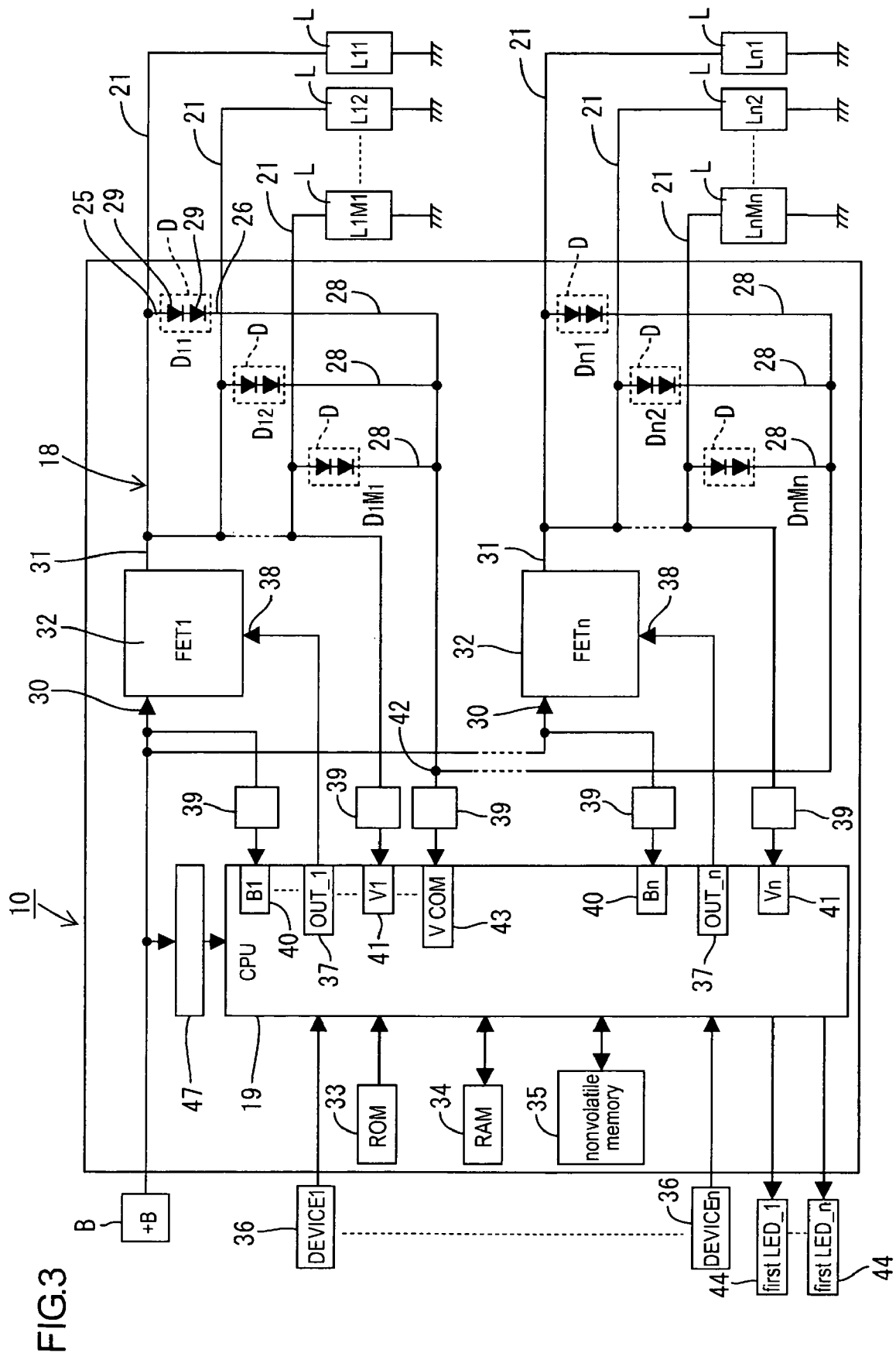
FIG. 3 is a block diagram showing an electrical configuration of the electric connection box.

The substrate side conduction path 18 comprises branch paths 21 branched into a plurality of pieces (see FIG. 3). As shown in FIG. 2, a through hole 22 (corresponding to a conduction path) connected with the branch path 21 is formed in the circuit board 12. One end of the metallic male tab 23 (corresponding to a conduction path) is inserted into the through hole 22 and connected therewith by such as soft-soldering. As shown in FIG. 1, the other end of the male tab 23 is bent in a direction along a plate face of the circuit board 12, penetrating the back wall of the connector 13. The other end of the male tab 23 is positioned inside of the connector 13 and connectable with the above-mentioned female terminal fitting 16. This allows the branch path 21 to be electrically connected with the load L.

As shown in FIG. 2, in the branch path 21, a narrow section 24 (corresponding to a heat easily-generating member) having a width narrower than other regions is formed near the through hole 22. This narrow section 24 is constituted to have a width narrower than other regions in the branch path 21, so as to generate heat at the time of energization more easily in comparison with other regions. In the branch path 21, an input terminal 25 of a diode element D (corresponding to a semiconductor element) having a PN junction is electrically connected to the area between the narrow section 24 and the through hole 22 by such as for example soft soldering, so that heat can be transferred. In addition, the diode element D being connected with the branch path so that heat can be transferred means a state where heat is transferred from the branch path 21 to the diode element D so that the temperature of the branch path 21 and that of the diode element D become nearly the same, and, in short, the diode element D is connected with the branch path 21.

Additionally, the diode element D is arranged in a manner so as to be superimposed on the surface of the substrate side conduction path 18 (the branch path 21) connected with the input terminal 25.

The output terminal 26 of the diode element D is connected with a land 27 formed on the circuit board 12. The land 27 is connected with the substrate side conduction path 18, that is different from the one of the branch path 21. The substrate side conduction path 18 having the output terminal 26 of the diode element D connected therewith is formed to be narrower than the branch path 21 and connected with the CPU 19, so as to become a signal conduction path 28 for transmitting a signal output from the diode element D to the CPU 19.

The signal conduction path 28 on the whole is formed to be narrower than the substrate side conduction path 18.

As shown in FIG. 3, a plurality (two in the present embodiment) of diodes 29 are connected with one diode element D in series. This can amplify the later-described voltage drop value. In the present embodiment, the diode element D is a molded package type. The diode element D is connected in a forward direction heading from the branch path 21 toward the signal conduction path 28.

Next, the electrical configuration of the electric connection box 10 is described. FIG. 3 is a block diagram showing the electrical configuration of the electric connection box 10.

The power supply B such as a battery is connected with the substrate side conduction path 18 inside of the electric connection box 10 through the wire 15 and the connector 13. The substrate side conduction path 18 is connected with (n) pieces (n is a natural number) of FETs 32 in parallel. This substrate side conduction path 18 is connected with a source 30 in the FET 32. The substrate side conduction path 18 connected with a drain 31 in each FET 32 is branched into a plurality of pieces so as to form branch paths 21. In the present embodiment, the FET of a P-ch type is used, however, the FET of a N-ch type may be used. Additionally, when using the N-ch type, the source 30 and the drain 31 are reversed. Each branch path 21 is connected with the load L through the connector 13 and the wire 15. (Mi) pieces ("Mi" is a natural number) of the loads L are connected with the (i)-th FET 32i ("i" is a natural number). In the following description, numerals such as "i" and "Mi" are allotted after the symbols of members, indicating that the member is the (i)-th or the (Mi)-th.

The power supply B is connected with the CPU 19 (corresponding to control means and judgment means) through a constant voltage power supply circuit 47. The CPU 19 controls each component, while recording its processing result in a RAM 34 or a nonvolatile memory 35 in accordance with the processing steps recorded in a ROM 33 (corresponding to memory means).

And also, the CPU 19, though not shown in details, obtains an electrical current value flowing into the FET 32 from detection means, which detects an electrical current flowing into the FET 32. As the detection means, such as a sense MOSFET connected with the FET 32 or measuring means for measuring a shunt resistor or Vds of the FET 32 may be used. The CPU 19 outputs an off-command signal to the FET 32 when, for example, a dead short-circuit occurs then an over current in the FET 21 exceeding a threshold current is detected by the detection means. This can prevent a damage of the FET 32 caused by the over current.

In addition, the FET 32 may comprise detection means for detecting an electrical current flowing in the FET 32 itself and cutting off means for cutting off an electrical current flowing in the FET 32 when an over current in the FET 32 exceeding a threshold is detected by the detection means.

The processing steps of switching on/off for switching on/off the load L is recorded in the ROM 33. In addition, the temperature-voltage data (corresponding to data) showing a correlation between a voltage drop value between the input/output terminals 25 and 26 of the diode element D (hereinafter referred also to as "voltage drop value") and a temperature is recorded in the ROM 33.

Figure 5:
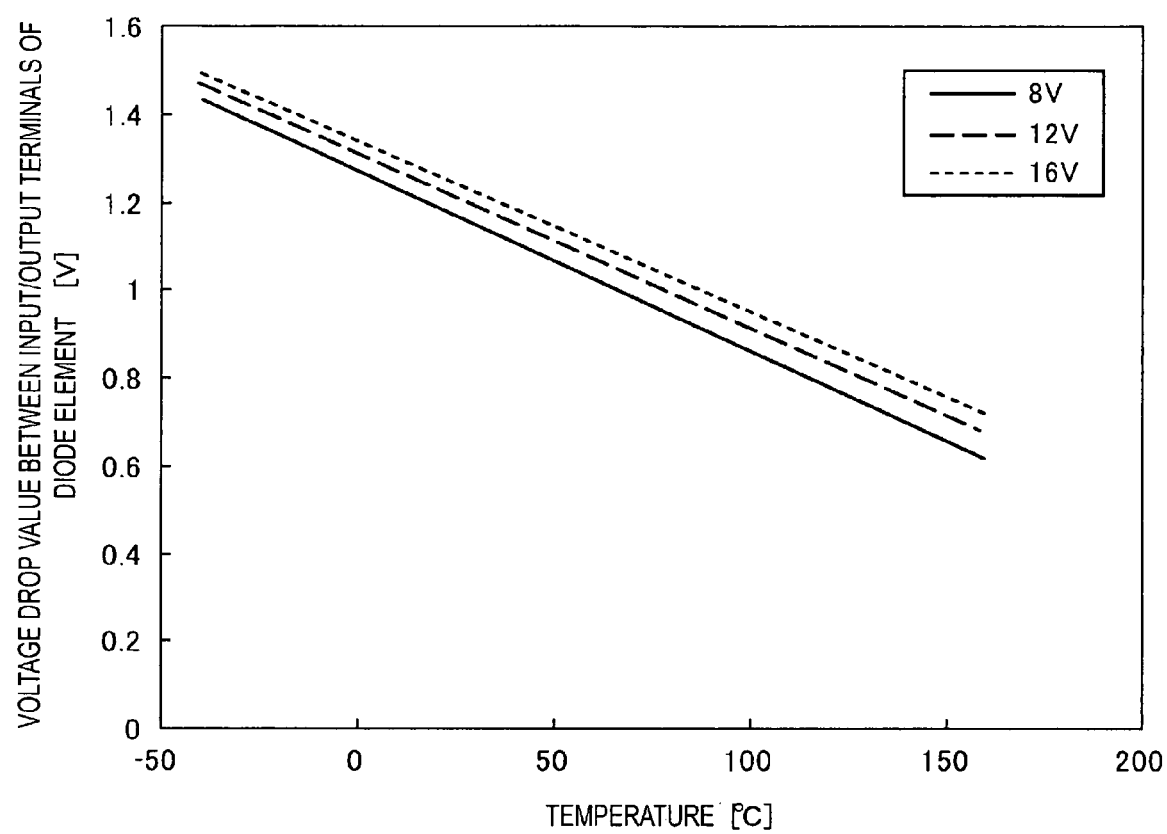
FIG. 5 is a graph showing a content of temperature-voltage data.

FIG. 5 shows a part of the content of the temperature-voltage data. A rise in the temperature of the diode element D causes the voltage drop value to be linearly decreased. Therefore, using the diode element D enables accurate temperature measurement of the branch path 21 connected with the diode element D in a broad temperature range.

As shown in FIG. 5, at the same temperature, as the voltage to be applied to the input terminal 25 of the diode element D gradually increases by 8V, 12V, and 16V, the voltage drop value also increases due to an increase in the electrical current flowing into the diode element D. Amendment of the voltage drop value based on the temperature-voltage data allows the temperature of the branch path 21 to be measured more accurately even when the voltage to be applied to the input terminal 25 of the diode element D has changed.

An abnormal flag indicating whether there is an abnormality in the branch path 21 connected with the drain 31 in an (i)-th FET 32i or not is recorded in the nonvolatile memory 35. When there is an abnormality in the branch path 2, "1" is input in the abnormal flag, otherwise, 0 is input.

In response to (n) pieces of the FETs 32, the CPU 19 is connected with (n) pieces of devices 36 such as an ECU. Also, the CPU 19 comprises (n) pieces of output ports 37 corresponding to (n) pieces of the FETs 32. The (i)-th output port 37 is connected with a gate 38 in the corresponding (i)-th FET 32i. The CPU 19 receives an on-signal for applying power to the FET 32i from the (i)-th device 36i, and then outputs an on-command signal from the (i)-th output port 37i to the FET 32i. And also, the CPU 19 receives an off-signal for cutting off power to the FET 32i from the (i)-th device 36i, and then outputs an off-command signal from the (i)-th output port 37i to the FET 32i.

The substrate side conduction path 18 is, after being branched to be connected with (n) pieces of the FETs 32, further branched in the front area to be connected with the FET 32, so as to be connected with a B port 40 provided in the CPU 19 through a voltage conversion circuit 39 for conversion into a voltage level capable of being input to the CPU 19. The B port 40 has the A/D conversion function. (n) pieces of the B ports 40 are provided for corresponding to (n) pieces of the FETs 32. The (i)-th B port 40 is connected with the substrate side conduction path 18 that is connected with the source 30 in the corresponding FET 32i. This allows the CPU 19 to obtain a voltage in the side of the source 30 in the FET 32i.

The substrate side conduction path 18 connected with the drain 31 in the FET 32 is branched at the position between the drain 31 and the input terminal 25 of the diode element D, and then connected with a V port 41 provided in the CPU 19 through the voltage conversion circuit 39. The V port 41 has the A/D conversion function. (n) pieces of the V ports 41 are provided for corresponding to (n) pieces of the FETs 32. The (i)-th V port 41 is connected with the substrate side conduction path 18 that is connected with the drain 31 in the FET 32i. This allows the CPU 19 to obtain a voltage in the side of the input terminal 25 of the diode element D.

As mentioned above, each of a plurality of branch paths 21 is electrically connected with the diode element D so that heat can be transferred. The diode element D is connected with the load L in parallel. The signal conduction paths 28 connected with the terminals in the downstream side of the diode element D are bundled together and connected each other at a connecting point 42, and then connected with a V com port 43 provided in the CPU 19 through the voltage conversion circuit 39. The V com port 43 has the A/D conversion function. This allows the CPU 19 to obtain a voltage in the side of the output terminal 26 of the diode element D.

Additionally, in the present embodiment, each of the B port 40, the V port 41, and the V com port 43 are provided with the voltage conversion circuit 39, however, the present invention is not limited to this, and the detection may be conducted by one A/D port with an analog voltage switch, such as a multiplexer.

The CPU 19 is connected with (n) pieces of first LEDs 44 corresponding to (n) pieces of the FETs 32, so as to control flickers of the first LEDs 44.

For example, due to such as aging degradation of the insulating coating (not shown) of the wire 15, an electrical current smaller than a threshold current for damage prevention of the FET 32 but greater than the current at the time of normal energization may flow, in short, a so-called layer short-circuit may occur. In such case, the current flowing in the wire 15 is greater than the threshold current, and the CPU 19 does not therefore output an off-command signal to the FET 32. As a result of a relatively large electrical current continuously flowing in the wire 15, heat generated from the core wire (not shown) remains within the wire 15, and might cause degradation of the insulating coating of the wire 15.

Considering the foregoing, in the present embodiment, the branch path 21 is electrically connected with the diode element D so that heat can be transferred. This allows the temperature of the branch path 21 and that of the diode element D to become nearly the same. As a result, the temperature of the branch path 21 can be calculated by detecting the temperature change of the voltage drop value between the input/output terminals 25 and 26 of the diode element D.

When the temperature of the diode element D exceeded a threshold, the CPU 19 executes the processing of switching on/off, such as outputting an off-command signal to the FET 32. As a result, smoke generation of the wire 15 at the time of the layer short-circuit can be suppressed.

Figure 4:
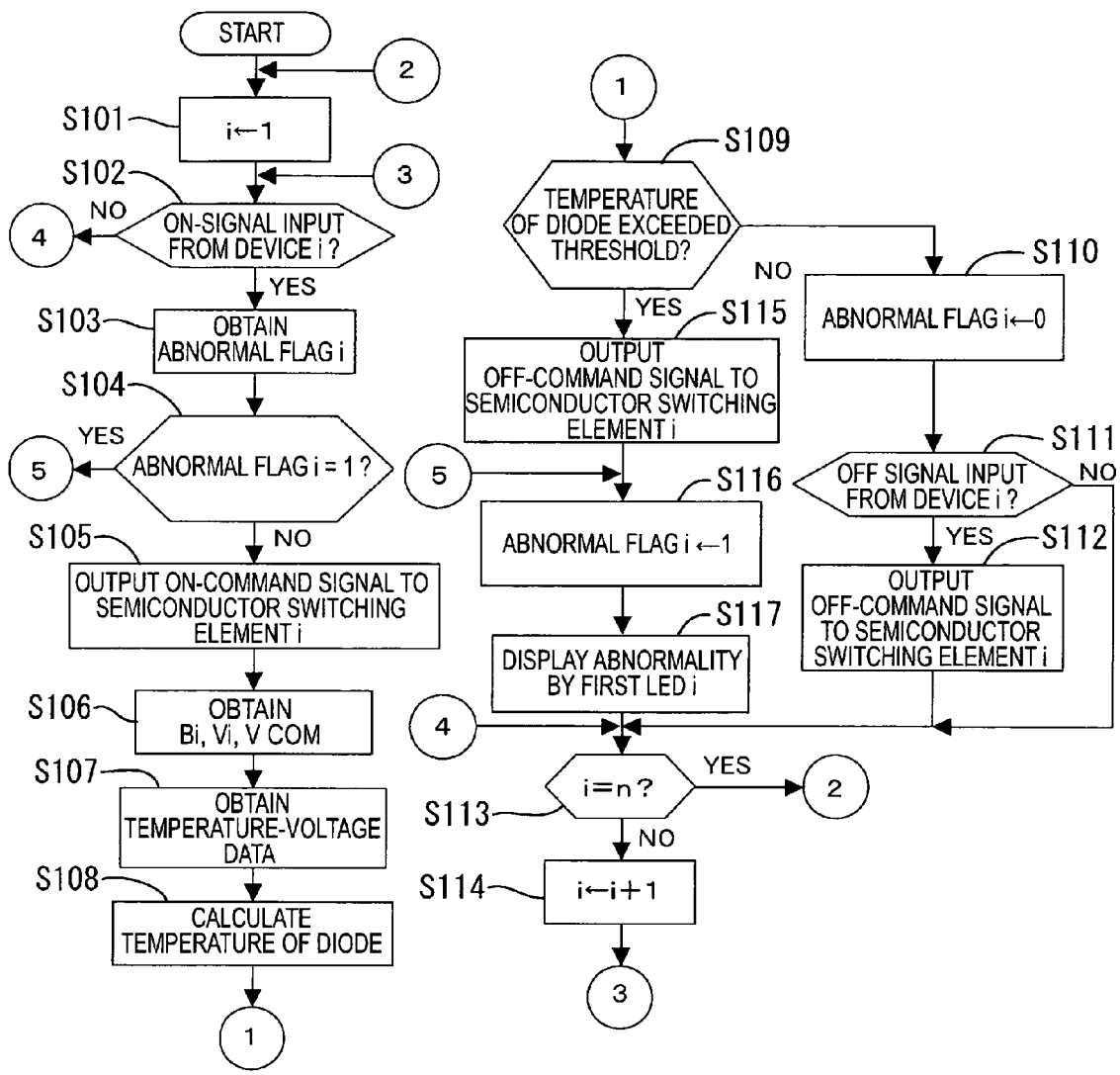
FIG. 4 is a flow chart of the processing of switching on/off.

In what follows, processing of switching on/off is described. In the electric connection box 10, the CPU 19 controls and executes the following processing of switching on/off. FIG. 4 is a flow chart showing the content of the processing of switching on/off.

Upon starting the processing of switching on/off, the CPU 19 judges whether or not an on-signal is input sequentially from the first (S101) to the (i)-th device 36i (S102). When an on-signal was input from the device 36i, the CPU 19 then obtains an abnormal flag i corresponding to the (i)-th FET 32i from the nonvolatile memory 35 (S103). When the abnormal flag i is "0" (S104: No), the CPU 19 outputs an on-command signal to the FET 32i. Accordingly, the CPU 19 energizes between the source 30 and the drain 31 in the FET 32i and supplies the electrical power to a plurality of loads LiM1 or loads LiMi connected with the drain 31 in the FET 32i.

Next, in the step S106, the CPU 19 obtains a voltage in the side of the source 30 in the FET 32i from a Bi port. The CPU 19 also obtains a voltage in the side of the input terminal 25 of a diode element Di1 or iMi from a Vi port. And also, the CPU 19 obtains a composite voltage in the side of the output terminal 26 of the diode element Di1 or DiMi from the V com port 43.

Here, if a layer short-circuit is occurring in any of the conduction paths 21, the temperature of that conduction path 21 rises. Then, the temperature of the diode element D connected with the conduction path 21 having a layer short-circuit occurred rises higher than those of the other diode elements D. This causes the voltage drop value to decrease, and thus an electrical current larger than those in the other diode elements D flows in the diode element D connected with the conduction path 21 having a layer short-circuit occurred. Accordingly, as a composite voltage of a plurality of the diode elements D, the voltage drop value of the diode element D connected with the conduction path 21 having a layer short-circuit occurred becomes dominant.

Next, the CPU 19 obtains the temperature-voltage data from the ROM 33 (S107). The CPU 19 calculates the voltage drop value between the input/output terminals 25 and 26 of the diode element D. Then, the CPU 19 amends the voltage drop value between the input/output terminals 25 and 26, based on a voltage applied to the input terminal 25 in the diode element D and the temperature-voltage data. In this moment, the CPU 19 functions as control means.

The CPU 19 calculates a temperature of the diode element D based on the amended voltage drop value (S108).

The CPU 19 judges whether or not the temperature of the diode element D which has been distinguished from the composite voltage exceeded a threshold (S109). In other words, the CPU 19 judges that the temperature of the diode element D has exceeded a threshold when the voltage drop value of the diode element (or, the amended voltage drop value) is smaller than a prescribed threshold. In this moment, the CPU 19 functions as judgment means. The CPU 19 outputs an off-command signal to the FET 32*i* (S115), when the temperature of the diode element D exceeded a threshold (S109: Yes). In this moment, the CPU 19 functions as control means. As mentioned above, in the composite voltage, the voltage drop value of the diode element D connected with the conduction path 21 having a layer short-circuit occurred is dominant. Accordingly, the CPU 19 can judge whether or not the temperature of the diode element D connected with the conduction path 21 having a layer short-circuit occurred exceeded a threshold.

Next, the CPU 19 records "1" in the (i)-th abnormal flag in the nonvolatile memory 35 (S116). Then, the CPU 19 informs an user that there occurred an abnormality in the conduction path connected with the FET 32*i*, by lighting the (i)-th first LED 44*i* (S117).

The CPU 19 repeats the above-mentioned processing until it reaches the (n)-th device 36*n* (S113: No, S114). The CPU 19 executes the above processing to the (n)-th device 36*n* (S113: Yes), before repeating the above processing from the first device 36 (S101).

When the temperature of the diode element D does not exceed the threshold (S109: No), the CPU 19 sets the abnormal flag in the nonvolatile memory 35 to "0" (S110).

Following this, the CPU 19 judges whether an off signal is input to the FET 32*i* from the (i)-th device 36*i*, and if so (S111, Yes), outputs an off-command signal to the FET 32*i*. The CPU 19 therefore switches off the load LiM1 or the load LiMi connected with the FET 32*i*. Next, the CPU 19 executes the processing in S113 and S114, then repeats the above processing until it reaches the (n)-th device 36, and after that, repeats again the above processing from the first device 36.

Additionally, when an on-signal is not input from the device 36*i* (S102: No), the CPU 19 executes S113 and S114, then waits until an on-signal is input from the device 36*i*.

In addition, when the abnormal flag i is "1" in S104 (Yes), the CPU 19 writes the abnormality information into the nonvolatile memory 35 by executing S116, and lights the (i)-th first LED 44*i* by executing S117. The subsequent processing is the same as the above.

The CPU 19 and an element for detecting temperatures are generally connected each other through two leads led out from the element. According to the present embodiment, the diode element D is connected with the branch path 21 and the signal conduction path 28, which is connected with the CPU 19. Accordingly, the branch path 21 can serve as one lead in the diode element D, and thereby simplifying the configuration of the electric connection box 10.

Additionally, in the present embodiment, the diode element D is mounted on the circuit board 12 and connected to the substrate side conduction path 18 (branch path 21) formed on this circuit board 12. This can simplify the configuration of the electric connection box 10.

And also, in the present embodiment, the multiple loads L are connected with each FET 32. Therefore, one FET 32 can control switching on/off of a plurality of the loads L, and thereby achieving a cost reduction.

Additionally, as shown in FIG. 5, a voltage drop value between the input/output terminals 25 and 26 of the diode element D changes in accordance with the voltage to be applied to the input terminal 25 of the diode element D. In consideration of this point, the present embodiment is constituted so that the temperature-voltage data indicating the correlation between a voltage drop value and a temperature is recorded in the ROM 33. Based on this temperature-voltage data, the voltage drop value between the input/output terminals 25 and 26 of the diode element D can be amended, and accurate temperature measurement can therefore be achieved, even when the voltage to be applied to the input terminal 25 of the diode element D changed.

Additionally, as shown in FIG. 5, the voltage drop value of the diode element D having a PN junction changes relatively linearly relative to the temperature, so that accurate judgment can be conducted in a broader temperature range.

In the present embodiment, the narrow section 24 is provided near the diode element D. The narrow section 24 is constituted so as to easily generate heat as compared with other substrate side conduction path 18. Therefore, when for example a layer short-circuit occurred, the temperature of the narrow section 24 rises higher than those of other parts. The narrow section 24 is arranged near the diode element D, so that the diode element D can certainly detect the occurrence of a short-circuit.

When the multiple loads L are connected with one FET 32, an over current flowing in the loads L may be detected by connecting a resistance in series to the load L and measuring the electrical current flowing in the resistance.

However, in the above method, a resistance needs to be connected with each load L. When a relatively large electrical current flows in the load, the cost of the resistance becomes relatively high. This may cause a cost increase.

In addition, even at a normal time, an electrical current flows in the resistance connected in series with the load L, and thereby causing the electrical power that should be supplied to the load L to be consumed in the resistance. This might cause a power loss.

In the present embodiment, the diode element D is arranged in a manner so as to be superimposed on the substrate side conduction path 18, so that the voltage drop of the diode element D associated with the temperature change is measured, and the over current flowing in the load L is thereby detected. This can achieve a cost reduction since there is no need to use a relatively expensive resistance.

Additionally, as shown in FIG. 3, the diode element D is connected with the load L in parallel, so that the loss of the power, that should be supplied to the load L, can be suppressed.

Embodiment 2

Figure 6:
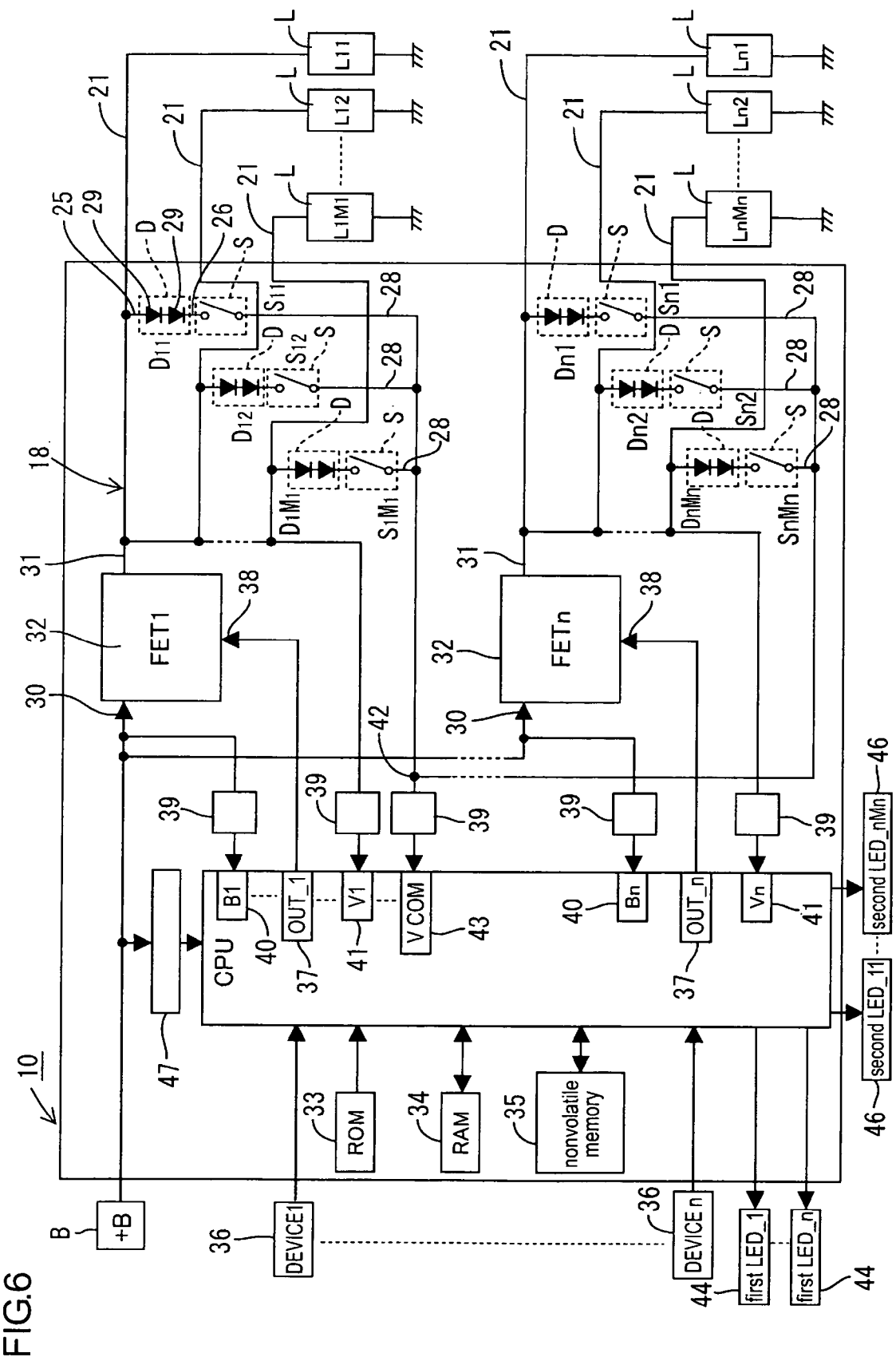
FIG. 6 is a block diagram showing an electrical structure of an electric connection box according to Embodiment 2.
Figure 7:
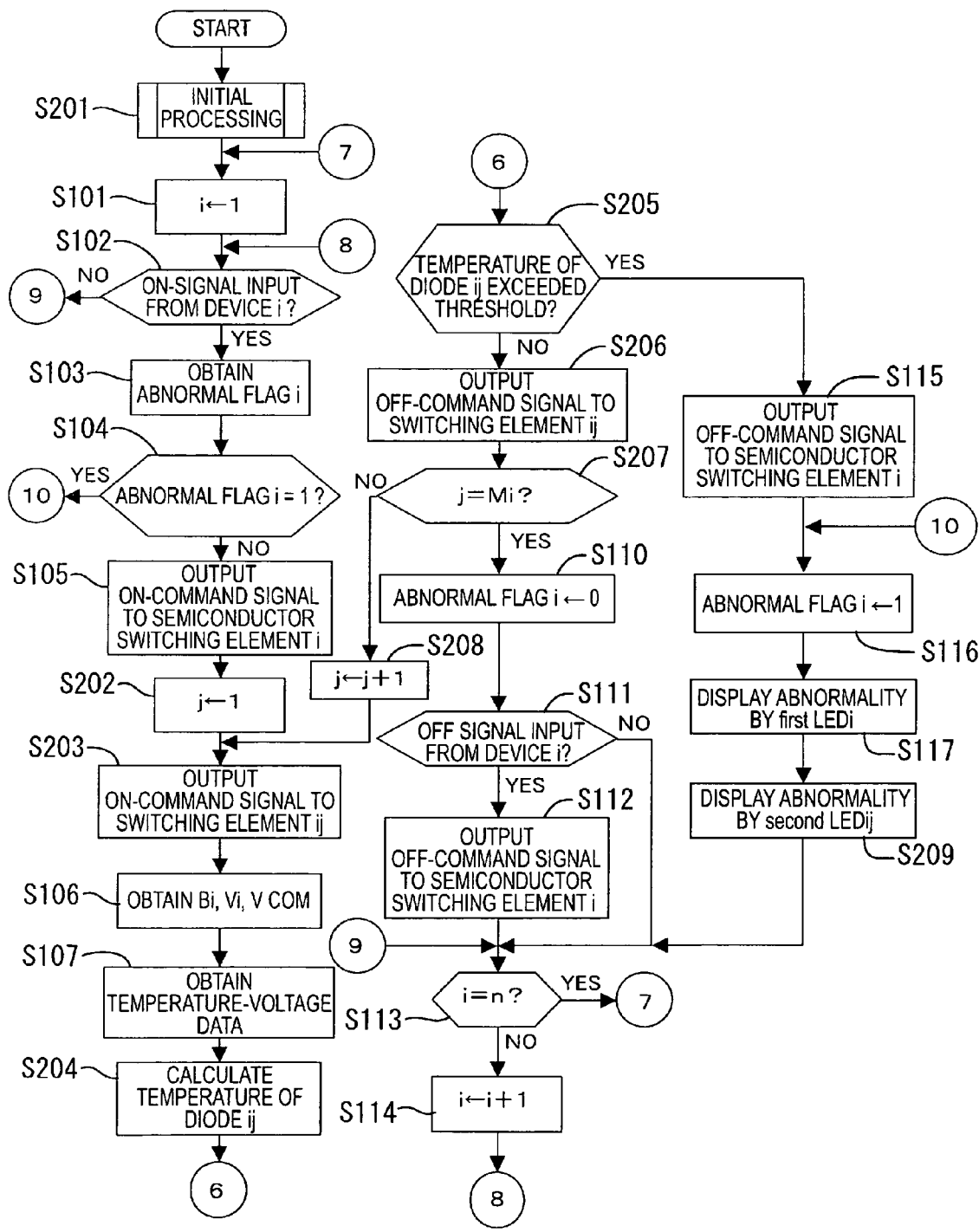
FIG. 7 is a main flow chart of the processing of switching on/off.
Figure 8:
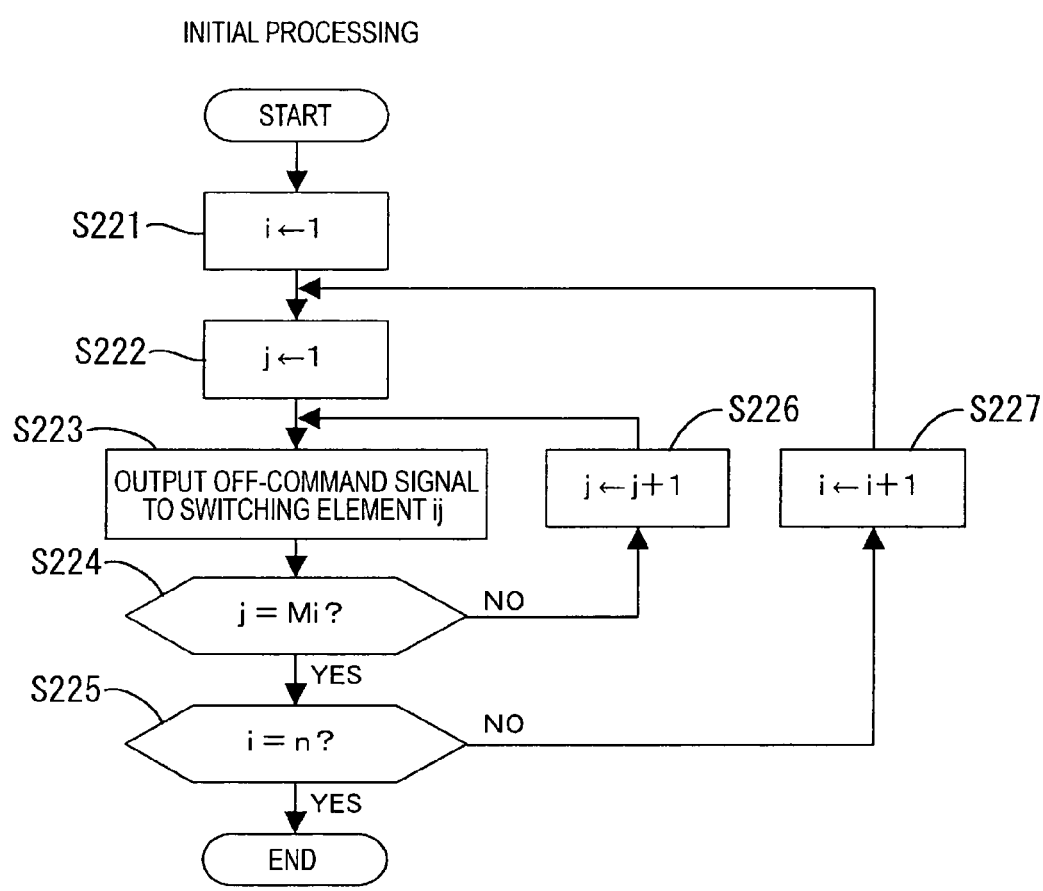
FIG. 8 is a flow chart showing initial processing.

In what follows, Embodiment 2 of the present invention is described in reference to FIGS. 6 to 8. In the present embodiment, as shown in FIG. 6, a switching element S such as for example an FET is arranged between each diode element D and the connecting point 42.

The CPU 19 selectively connects with any one of a plurality of diode elements D by outputting an on-command signal and an off-command signal to the switching element S. The on-command signal and the off-command signal are corresponding to selection signals.

In addition, the CPU 19 are connected with the multiple second LEDs 46 provided in a manner so as to correspond to all the diode elements D. The CPU 19 controls lighting of the second LEDs 46.

The configurations other than the above are nearly the same as embodiment 1, and thus, the same numerals are allotted to the same members so as to omit repetitive descriptions thereof.

FIG. 7 is a main flow chart of the processing of switching on/off according to Embodiment 2. Upon starting the processing of switching on/off, the CPU 19 firstly executes an initial processing (S201).

FIG. 8 shows a flow chart of the initial processing. The CPU 19 executes the processing from S221 to S227, so as to output off-command signals to all the switching elements S. Accordingly, the CPU 19 switches off all the switching elements S.

Next, the CPU 19 executes the processing same as those from S101 to S105 in FIG. 4. When the abnormal flag is "0" (S104: No), the CPU 19 then outputs an on-command signal to the FET 32i (S105).

Next, the CPU 19 outputs an on-command signal to a switching element Sij connected with the FET 32i sequentially from the first one (S202). Thereby a diode element Dij (j is a natural number) is selectively connected with the CPU 19.

Next, the CPU 19 executes the processing same as those from S106 to S107 in FIG. 4. The CPU 19 calculates the temperature of the diode element Dij based on the amended voltage drop value (S204).

The CPU 19 judges whether or not the temperature of the diode element Dij exceeded a threshold (S205). In this moment, the CPU 19 functions as judgment means. When the temperature of the diode element Dij exceeded the threshold (S205: Yes), the CPU 19 executes the processing same as those from S115 to S117 in FIG. 4.

Next, the CPU 19 lights a second LED 46ij. This allows the CPU 19 to inform the user of which the diode element Dij connected with the branch path 21 is having an abnormality occurred in the branch path 21.

The CPU 19 repeats the above-mentioned processing until it reaches the (n)-th device 36n (S113: No, S114). The CPU 19 executes the above processing to the (n)-th device 36n (S113: Yes), before repeating the above processing from the first device 36 (S101).

When the temperature of the diode element Dij does not exceed the threshold (S205: No), the CPU 19 outputs an off-command signal to the switching element Sij. Thereby the CPU 19 cuts off the electrical connection between the diode element Dij and the CPU 19.

Next, the CPU 19 executes the above mentioned processing on the switching element from S11 to SiMi those connected with the FET 32i (S207, S208).

Upon executing the above-mentioned processing on the switching element SiMi (S207: Yes), the CPU 19 executes the processing same as those from S110 to S112 in FIG. 4. Next, the CPU 19 executes the processing in S113 and S114 in FIG. 4, then repeats the above processing until it reaches the (n)-th device 36, and after that, repeats again the above processing from the first device 36.

In addition, when the abnormal flag i is "1" in S104 (Yes), the CPU 19 writes the abnormality information into the nonvolatile memory 35 by executing S116, and lights the (i)-th first LED 44i by executing S117. The subsequent processing is the same as the above.

In the present embodiment, connecting the CPU 19 with any one of the multiple diode elements Dij and sequentially judging whether the voltage drop value of said diode element Dij is larger than the threshold allows the judgment on which of the multiple conduction paths 21 has a layer short-circuit occurred.

Embodiment 3

Figure 9:
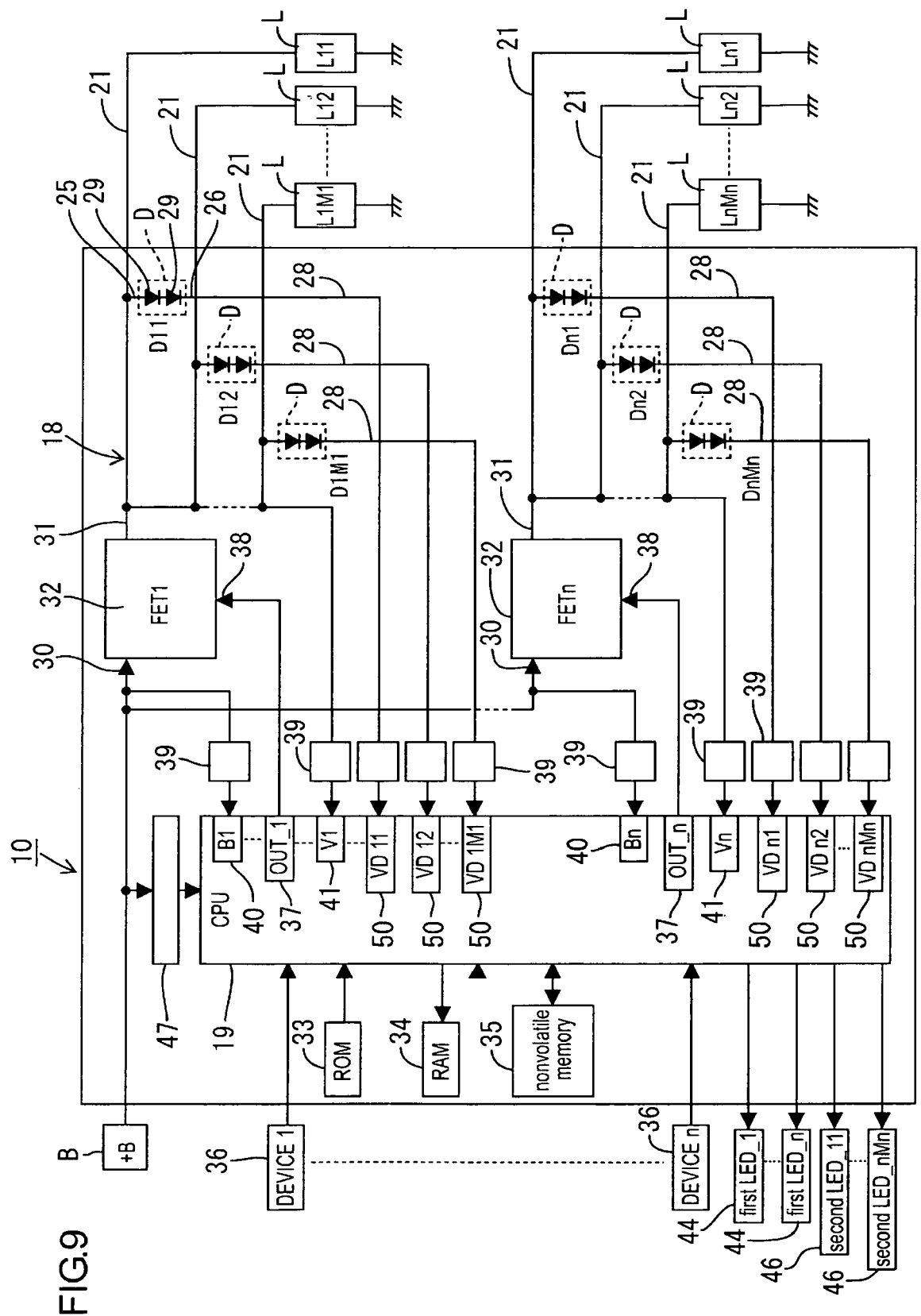
FIG. 9 is a block diagram showing an electrical structure of an electric connection box according to Embodiment 3.
Figure 10:
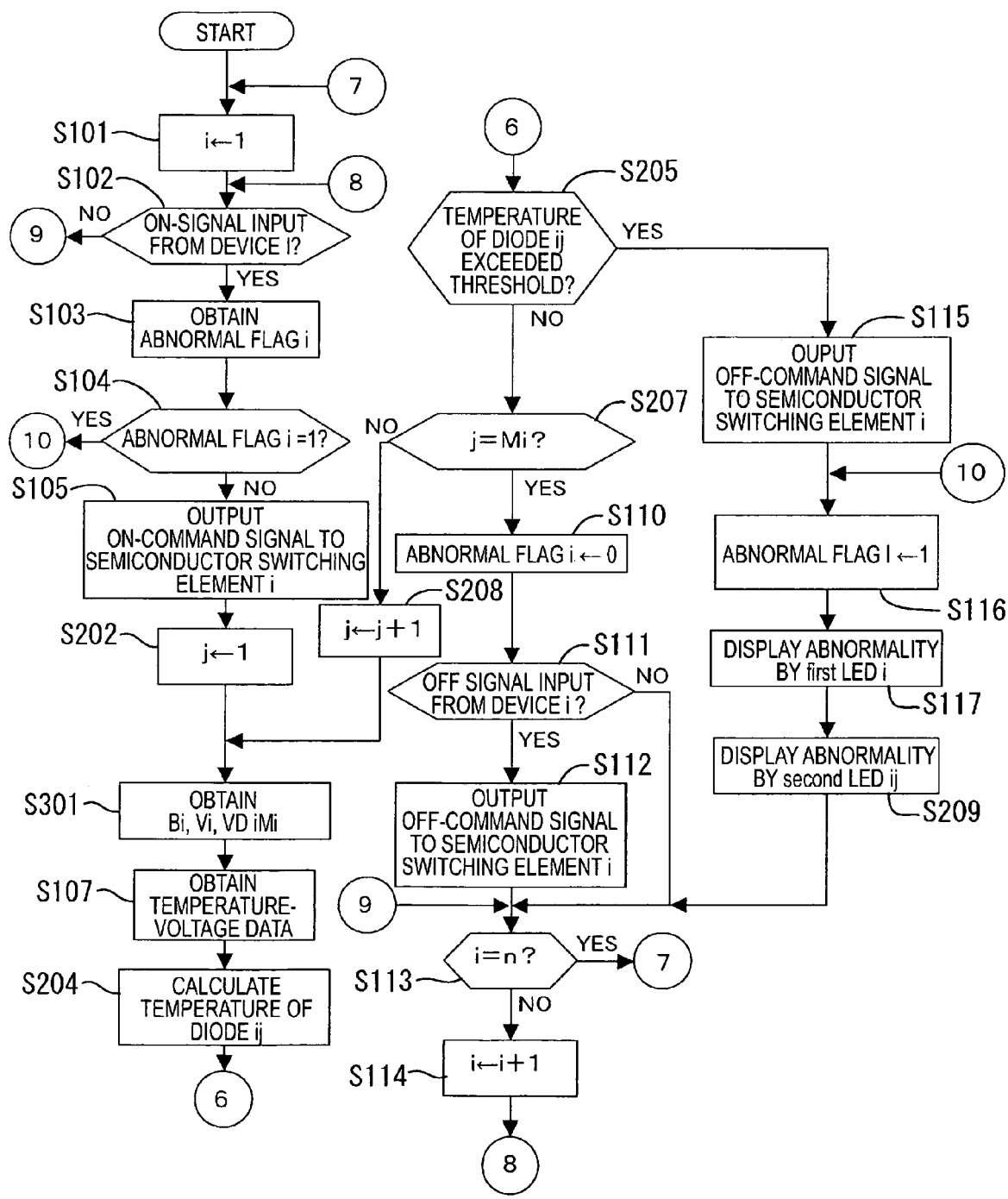
FIG. 10 is a flow chart of the processing of switching on/off.

In what follows, Embodiment 3 of the present invention is described in reference to FIGS. 9 and 10. In the present embodiment, as shown in FIG. 9, a signal conduction path 28 connected with a terminal in the downstream side of each diode element D is connected with a VD port 50 provided in the CPU 19 through the voltage conversion circuit 39. The VD port 50 is provided so as to correspond to each diode element D. Specifically, a diode element DiMi in the downstream side of the (i)-th FETi and connected with the (Mi)-th substrate side conduction path 18 is connected with a VD port 50iMi. Each VD port 50 has the A/D conversion function. This allows the CPU 19 to obtain a voltage in the side of the output terminal 26 of the diode element D.

The configurations other than the above are nearly the same as Embodiment 2, and thus, the same numerals are allotted to the same members so as to omit repetitive descriptions thereof.

FIG. 10 is a main flow chart of the processing of switching on/off according to Embodiment 3. Upon starting the processing of switching on/off, the CPU 19 executes the processing same as those from S101 to S202 in FIG. 7. Next, in the step S301, the CPU 19 obtains a voltage in the side of the source 30 in the FET 32i from the Bi port. And also, the CPU 19 obtains a voltage in the side of the input terminal 25 of the diode element Di1 or the diode element DiMi from the Vi port. And also, the CPU 19 obtains a voltage in the side of each output terminal 26 of the diode element D11 or the diode element DnMn from each VD port 50 iMi.

Next, the CPU 19 executes the processing same as those from S107 to S205 in FIG. 7. When the temperature of the diode element Dij exceeded the threshold (S205: Yes), the CPU 19 executes the processing same as those from S115 to S209 in FIG. 7.

The CPU 19 repeats the above-mentioned processing until it reaches the (n)-th device 36n (S113: No, S114). The CPU 19 executes the above processing on the (n)-th device 36n (S113: Yes), before repeating the above processing from the first device 36 (S101).

When the temperature of the diode element Dij does not exceed the threshold (S205: No), the CPU 19 executes the above processing on the diode elements from Di1 to DiMi, those connected with the FET 32i (S207, S208).

Upon executing the above-mentioned processing on the diode element DiMi (S207: Yes), the CPU 19 executes the processing same as those from S110 to S112 in FIG. 7. Next, the CPU 19 executes the processing in S113 and S114 in FIG. 7, then repeats the above processing until it reaches the (n)-th device 36, and after that, repeats again the above processing from the first device 36.

In the present embodiment, the switching element S connected with each diode element D can be omitted. This achieves a further cost reduction.

Other Embodiments

With embodiments of the present invention described above with reference to the accompanying drawings, it is to be understood that the invention is not limited to those precise embodiments, and the embodiments as below, for example, can be within the scope of the present invention.

(1) In the present embodiments, the diode element D is used as a semiconductor element, however, the present invention is not limited to this, and any arbitrary semiconductor elements having a PN junction such as a zener diode and a transistor may be employed. Additionally, when using a zener diode, the zener diode may be connected in a direction opposite to the direction heading from the branch path 21 toward the signal conduction path 28. As for a transistor, for example, whether or not a voltage Vbe between the base and the emitter is greater than the threshold may be judged.

(2) In the present embodiments, the conduction path has a plurality of branch paths 21, however, the present invention is not limited to this, and one semiconductor switching element and one load L may be connected through one conduction path, with which a semiconductor element may be connected.

(3) In the present embodiments, the ROM 33, which is provided with the temperature-voltage data showing a correlation between a voltage to be applied to the input terminal 25 of the diode element D and a voltage drop value between the input/output terminals 25 and 26, is comprised, however, the present invention is not limited to this. When, for example, a voltage to be applied to the input terminal 25 of the diode element D from a constant voltage circuit is kept constant, amendment of the voltage drop value is unnecessary, and the amendment based on the temperature-voltage data may not necessarily be conducted.

(4) The circuit protector includes the electric connection box, and moreover, any electrical devices. The circuit protector may not have the case 11. In the present embodiments, the circuit protector according to the present invention is applied to the electric connection box to be mounted in a vehicle, however, the present invention is not limited to this, and the circuit protector according to the present invention may be applied to any electrical circuits.

(5) In the present embodiments, the molded package type diode element D is used, however, a bare chip type diode element D may be used. A bare chip diode is preferable since it easily absorbs heat from the outside, as compared with a molded package type diode.

(6) In the present embodiments, the diode element D comprises two diodes 29, however, the present invention is not limited to this, and the diode element D may comprise one or three or more diodes 29.

(7) In the present embodiments, the CPU 19 functions as judgment means, however, the present invention is not limited to this, and the judgment means may be constituted by an analog comparator.

(8) In the present embodiments, the diode element D is connected with the load L in parallel, however, the present invention is not limited to this, and the diode element D may be connected with the load L in series, with its both ends provided with branch paths for detecting voltages, and the branch paths may be connected with the CPU 19.

The invention claimed is:

1. A circuit protector comprising:
a semiconductor switching element for connection with a power supply,
a conduction path connecting the semiconductor switching element with a load,
a semiconductor element connected with the conduction path electrically and to transfer heat and having a PN junction,
judgment means for judging whether a voltage drop value between input/output terminals of the semiconductor element is larger than a threshold or not, and
control means for outputting an off-command signal to the semiconductor switching element if a judgment is made by the judgment means that the voltage drop value is smaller than the threshold.

2. The circuit protector according to claim 1, wherein
the conduction path comprises a branch path branched into a plurality of pieces,
a plurality of the branch paths are connected respectively with the load and the semiconductor element,
the judgment means judges whether or not any one of voltage drop values between input/output terminals of a plurality of the semiconductor elements is greater than the threshold, and
the control means outputs an off-command signal to the semiconductor switching element when a judgment is made by the judgment means that any one of the voltage drop values between input/output terminals of a plurality of the semiconductor elements is smaller than the threshold.

3. The circuit protector according to claim 2, wherein a switching element for selectively connecting any one of a plurality of the semiconductor elements and the judgment means upon receiving a selection signal output from the control means is arranged between a plurality of the semiconductor elements and the judgment means.

4. The circuit protector according to claim 1, comprising memory means recording data showing a correlation between a voltage to be applied to an input terminal of the semiconductor element and a voltage drop value between input/output terminals of the semiconductor element,
wherein the control means amends a voltage drop value between input/output terminals of the semiconductor element based on a voltage applied to an input terminal of the semiconductor element and the data then outputs the amended voltage drop value to the judgment means,
the judgment means judges whether the amended voltage drop value is greater than a threshold or not, and
the control means outputs an off-command signal to the semiconductor switching element when a judgment is made by the judgment means that the amended voltage drop value is smaller than the threshold.

5. The circuit protector according to claim 1, wherein the semiconductor element is connected with the load in parallel.

6. An electric connection box comprising:
a semiconductor switching element for connection with a power supply,
a conduction path connecting the semiconductor switching element with a load,
a semiconductor element connected with the conduction path electrically and to transfer heat and having a PN junction,
judgment means for judging whether a voltage drop value between input/output terminals of the semiconductor element is larger than a threshold or not, and
control means for outputting an off-command signal to the semiconductor switching element if a judgment is made by the judgment means that the voltage drop value is smaller than the threshold.

7. The electric connection box according to claim 6, wherein the conduction path comprises a branch path branched into a plurality of pieces,
a plurality of the branch paths are connected respectively with the load and the semiconductor element,
the judgment means judges whether or not any one of voltage drop values between input/output terminals of a plurality of the semiconductor elements is greater than the threshold, and the control means outputs an off-command signal to the semiconductor switching element when a judgment is made by the judgment means that any one of the voltage drop values between input/output terminals of a plurality of the semiconductor elements is smaller than the threshold.

8. The electric connection box according to claim 7, wherein a switching element for selectively connecting any one of a plurality of the semiconductor elements and the judgment means upon receiving a selection signal output from the control means is arranged between a plurality of the semiconductor elements and the judgment means.

9. The electric connection box according to claim 6, comprising memory means recording data showing a correlation between a voltage to be applied to an input terminal of the semiconductor element and a voltage drop value between input/output terminals of the semiconductor element, wherein the control means amends a voltage drop value between input/output terminals of the semiconductor element based on a voltage applied to an input terminal of the semiconductor element and the data then outputs the amended voltage drop value to the judgment means, the judgment means judges whether the amended voltage drop value is greater than a threshold or not, and the control means outputs an off-command signal to the semiconductor switching element when a judgment is made by the judgment means that the amended voltage drop value is smaller than the threshold.

10. The circuit protector according to claim 6, wherein the semiconductor element is connected with the load in parallel.

11. The electric connection box according to claim 6, wherein the semiconductor switching element is mounted in a circuit board, the conduction path includes a substrate side conduction path formed on the circuit board by a printed wiring technology, and the semiconductor element is connected with the substrate side conduction path.

12. The electric connection box according to claim 11, wherein a heat easily-generating member generating heat more easily than other parts in the substrate side conduction path is formed in the substrate side conduction path near a part connected with the semiconductor element.

* * * * *